United States Patent
No et al.

(10) Patent No.: US 11,546,134 B2
(45) Date of Patent: Jan. 3, 2023

(54) METHOD AND APPARATUS FOR PROCESSING CIPHERTEXT BASED ON HOMOMORPHIC ENCRYPTION

(71) Applicants: SAMSUNG ELECTRONICS CO., LTD., Suwon-si (KR); SNU R&DB FOUNDATION, Seoul (KR); Industry Academic Cooperation Foundation Chosun University, Gwangju (KR)

(72) Inventors: Jong Seon No, Seoul (KR); Yong Woo Lee, Seoul (KR); Young Sik Kim, Gwangju (KR); Joon Woo Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 17/172,643

(22) Filed: Feb. 10, 2021

(65) Prior Publication Data
US 2021/0328766 A1 Oct. 21, 2021

Related U.S. Application Data

(60) Provisional application No. 63/010,812, filed on Apr. 16, 2020.

(30) Foreign Application Priority Data

Oct. 22, 2020 (KR) .................. 10-2020-0137640

(51) Int. Cl.
*H04L 9/00* (2022.01)
*H04L 9/30* (2006.01)
*G06F 17/11* (2006.01)

(52) U.S. Cl.
CPC .................. *H04L 9/008* (2013.01)

(58) Field of Classification Search
CPC ......... H04L 9/008; H04L 9/3093; G06F 17/11
See application file for complete search history.

(56) References Cited

U.S. PATENT DOCUMENTS

| 10,211,974 B2 | 2/2019 | Seo et al. |
| 10,333,696 B2 | 6/2019 | Ahmed |
| 2008/0133982 A1* | 6/2008 | Rawlins ............... H04B 1/0475 714/699 |

(Continued)

FOREIGN PATENT DOCUMENTS

| KR | 10-2015-0043062 A | 4/2015 |
| KR | 10-2015-0083391 A | 7/2015 |

(Continued)

OTHER PUBLICATIONS

Faster Bootstrapping with Polynomial Error, by Peikert al et. published 2014 (Year: 2014).*

(Continued)

*Primary Examiner* — Vu V Tran
(74) *Attorney, Agent, or Firm* — NSIP Law

(57) ABSTRACT

A method and apparatus for processing a ciphertext based on homomorphic encryption. The method includes determining an approximate polynomial corresponding to a modulus reduction for bootstrapping a ciphertext based on samples extracted from the modulus reduction, and bootstrapping the ciphertext based on the approximate polynomial.

20 Claims, 6 Drawing Sheets

(56) References Cited

U.S. PATENT DOCUMENTS

| | | | |
|---|---|---|---|
| 2016/0254909 A1* | 9/2016 | Garcia Morchon | H04W 12/0433 380/46 |
| 2017/0063525 A1* | 3/2017 | Bacon | H04L 9/008 |
| 2018/0183570 A1 | 6/2018 | Zheng | |
| 2019/0007196 A1* | 1/2019 | Malluhi | H04L 63/0428 |
| 2019/0334694 A1* | 10/2019 | Chen | H04L 9/008 |
| 2019/0394019 A1 | 12/2019 | Gao | |
| 2020/0019867 A1 | 1/2020 | Nandakumar et al. | |
| 2020/0036511 A1* | 1/2020 | Cheon | H04L 63/0428 |
| 2020/0076570 A1 | 3/2020 | Musuvathi et al. | |
| 2020/0084017 A1 | 3/2020 | Bent et al. | |

FOREIGN PATENT DOCUMENTS

| | | |
|---|---|---|
| KR | 10-1600016 B1 | 3/2016 |
| KR | 10-2017-0142419 A | 12/2017 |
| KR | 10-2018-0013064 A | 2/2018 |
| KR | 10-2018-0092199 A | 8/2018 |
| KR | 10-1965628 B1 | 4/2019 |
| KR | 10-2040106 B1 | 11/2019 |
| KR | 10-2040120 B1 | 11/2019 |

OTHER PUBLICATIONS

Alperin-Sheriff, Jacob, et al., "Faster Bootstrapping with Polynomial Error", International Association for Cryptologic Research (IACR), Jun. 14, 2014.

Lee, Yongwoo, et al., "Near-optimal Polynomial for Modulus Reduction Using L2-norm for Approximate Homomorphic Encryption", International Association for Cryptologic Research (IACR), Apr. 27, 2020.

Extended European Search Report dated Aug. 20, 2021 in counterpart EP Application No. 21163199.9.

Han, Kyoohyung, and Dohyeong Ki. "Better bootstrapping for approximate homomorphic encryption." *Cryptographers' Track at the RSA Conference*. Springer, Cham, 2020 (26 pages in English).

Cheon, Jung Hee, et al. "Bootstrapping for approximate homomorphic encryption." *Annual International Conference on the Theory and Applications of Cryptographic Techniques*. Springer, Cham, 2018 (21 pages in English).

Chen, Hao, Ilaria Chillotti, and Yongsoo Song. "Improved bootstrapping for approximate homomorphic encryption." *Annual International Conference on the Theory and Applications of Cryptographic Techniques*. Springer, Cham, 2019 (21 pages in English).

* cited by examiner

METHOD AND APPARATUS FOR PROCESSING CIPHERTEXT BASED ON HOMOMORPHIC ENCRYPTION

CROSS-REFERENCE TO RELATED APPLICATIONS

This application claims the benefit under 35 USC 119(e) of U.S. Provisional Application No. 63/010,812 filed on Apr. 16, 2020, and the benefit under 35 USC 119(a) of Korean Patent Application No. 10-2020-0137640 filed on Oct. 22, 2020, in the Korean Intellectual Property Office, the entire disclosures of which are incorporated herein by reference for all purposes.

BACKGROUND

1. Field

The following description relates to a method and apparatus for processing a ciphertext based on homomorphic encryption.

2. Description of Related Art

Fully homomorphic encryption is an encryption scheme that enables an arbitrary logical operation or a mathematical operation to be performed on encrypted data. A fully homomorphic encryption method maintains security in data processing. Fully homomorphic encryption enables customers to receive many services while preserving privacy.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of processing a ciphertext based on homomorphic encryption includes determining an approximate polynomial corresponding to a modulus reduction for bootstrapping a ciphertext based on samples extracted from the modulus reduction, and bootstrapping the ciphertext based on the approximate polynomial.

The determining may include determining a coefficient of the approximate polynomial such that current differences between the samples extracted from the modulus reduction and values of the approximate polynomial are less than a predetermined threshold.

The determining may include verifying whether the current differences between the samples extracted from the modulus reduction and the values of the approximate polynomial are less than the predetermined threshold, and increasing, in response to the current differences being greater than or equal to the predetermined threshold, the number of samples or a degree of the approximate polynomial based on a comparison between the current differences and differences determined in a previous step.

The determining may include increasing the number of samples, in response to a similarity between the current differences and the differences determined in the previous step being less than a predetermined threshold similarity, and increasing the degree of the approximate polynomial, in response to the similarity being greater than or equal to the predetermined threshold similarity.

The differences between the samples and the values of the approximate polynomial may be determined based on an L2-norm between the samples and the values of the approximate polynomial.

The determining may include determining the approximate polynomial including odd-order terms.

The determining may include determining the approximate polynomial using the Chebyshev polynomials as a basis.

The samples may be extracted from a piecewise continuous interval having a symmetric shape about a reference point in a function corresponding to the modulus reduction.

The samples may be extracted from a portion divided by the reference point in the piecewise continuous interval.

The bootstrapping may include bootstrapping the ciphertext by homomorphically evaluating the modulus reduction using the approximate polynomial.

In another general aspect, an apparatus for processing a ciphertext based on homomorphic encryption includes one or more processors, wherein the one or more processors are configured to determine an approximate polynomial corresponding to a modulus reduction for bootstrapping a ciphertext based on samples extracted from the modulus reduction, and bootstrap the ciphertext based on the approximate polynomial.

In another general aspect, a method includes determining an initial approximate polynomial corresponding to a modulus reduction for bootstrapping a ciphertext based on an initial number of samples extracted from the modulus reduction; calculating an error between the initial approximate polynomial and the modulus reduction function; increasing one of the initial number of samples and a degree of the initial approximate polynomial based on the error; determining an updated approximate polynomial based on either the increased number of samples or the increased degree of the initial approximate polynomial; and homomorphically evaluating the modulus reduction using the updated approximate polynomial.

The calculating of the error may include determining that differences between the initial number of samples extracted from the modulus reduction and values of the initial approximate polynomial are greater than or equal to a threshold.

Other features and aspects will be apparent from the following detailed description, the drawings, and the claims.

Figure 1:
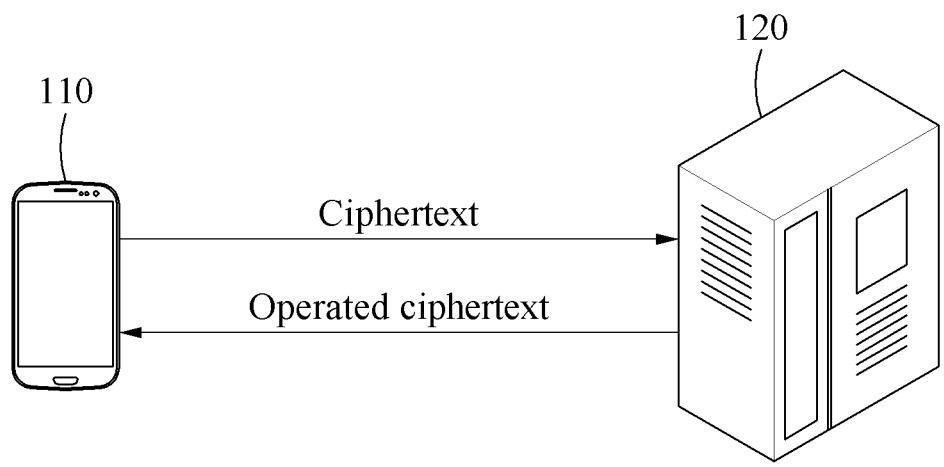
FIG. 1 illustrates an example of the operation of a user terminal and a server for processing a ciphertext enciphered based on homomorphic encryption.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Accordingly, the examples are not construed as being limited to the disclosure and should be understood to include all changes, equivalents, and replacements within the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. The following specific structural or functional descriptions are exemplary to merely describe the examples, and the scope of the examples is not limited to the descriptions provided in the present specification. Various changes and modifications can be made thereto by those of ordinary skill in the art. Like reference numerals in the drawings denote like elements, and a known function or configuration will be omitted herein.

FIG. 1 illustrates an example of the operation of a user terminal and a server for processing a ciphertext enciphered based on homomorphic encryption.

Referring to FIG. 1, a user terminal 110 and a server 120 are shown. The user terminal 110 is a device controlled by a user, and may include, for example, various computing devices such as a smart phone, a tablet, a laptop, and a personal computer, various wearable devices such as a smart watch and smart glasses, various home appliances such as a smart speaker, a smart TV, and a smart refrigerator, a smart vehicle, a smart kiosk, an Internet of Things (IoT) device, a drone, a robot, and the like. The user terminal 110 may encrypt stored data based on homomorphic encryption and transmit the encrypted data to the server 120. The user terminal 110 may transmit data to the server 120 to use various services provided by the server 120. In this example, the data to be transmitted may be encrypted to protect information therein. For the server 120 to process the encrypted data, the user terminal 110 may encrypt the data based on homomorphic encryption.

Homomorphic encryption may be an encryption scheme that allows computation on encrypted data without decryption. Homomorphic encryption may handle encrypted data without decryption and thus, may be suitable for data-massive applications that require privacy protection. For example, homomorphic encryption may be a Cheon-Kim-Kim-Song (CKKS) scheme, which will be described in detail later. Herein, not-encrypted data may be referred to as a plaintext, and encrypted data may be referred to as a ciphertext.

Homomorphic encryption contains noise, and the noise level may increase as an operation on a ciphertext is performed. In order to prevent noise from overwhelming the data, noise processing, that is, bootstrapping to refresh the noise may be performed. Through bootstrapping, the parameter size and computation overhead may be fixed regardless of circuit depth.

A ciphertext encrypted by homomorphic encryption has the maximum number of possible operations without bootstrapping, and the maximum number of possible operations may be denoted by a level l ($0<l\leq L$). Bootstrapping may be a process of generating a level-L ciphertext having the same message by refreshing a level-0 ciphertext on which an operation is not performable any further.

The server 120 may perform various operations on the ciphertext through bootstrapping. At this time, decryption of the ciphertext is not required, and thus privacy is not invaded. In an example, the ciphertext operated by the server 120 may be transmitted back to the user terminal 110, and the user terminal 110 may provide data obtained by decrypting the ciphertext to the user or use the data for a subsequent operation.

Homomorphic evaluation of modulus reduction is important in bootstrapping. Only arithmetic operations may be evaluated as homomorphic. Since modulus reduction is not an arithmetic operation, a polynomial approximation for modulus reduction is required. Herein, homomorphic evaluation may also be expressed as obtaining a homomorphic value or performing homomorphically.

Herein, the problem of finding an approximate polynomial for modulus reduction may be substituted for an L2-norm minimization problem of directly calculating an optimal solution. Therefore, the limitation due to polynomial approximation using a trigonometrical function (for example, a sine function, etc.) may be easily overcome. A discretized optimization method may be applied to obtain an approximate polynomial of modulus reduction. Through the solution of the modified discretization problem, it is possible to reduce the degree of the approximate polynomial for the modulus reduction while achieving a low margin of error. Further, the level loss of bootstrapping may be reduced, and a solution of the cast problem may be determined in an efficient way without iteration.

Figure 2:
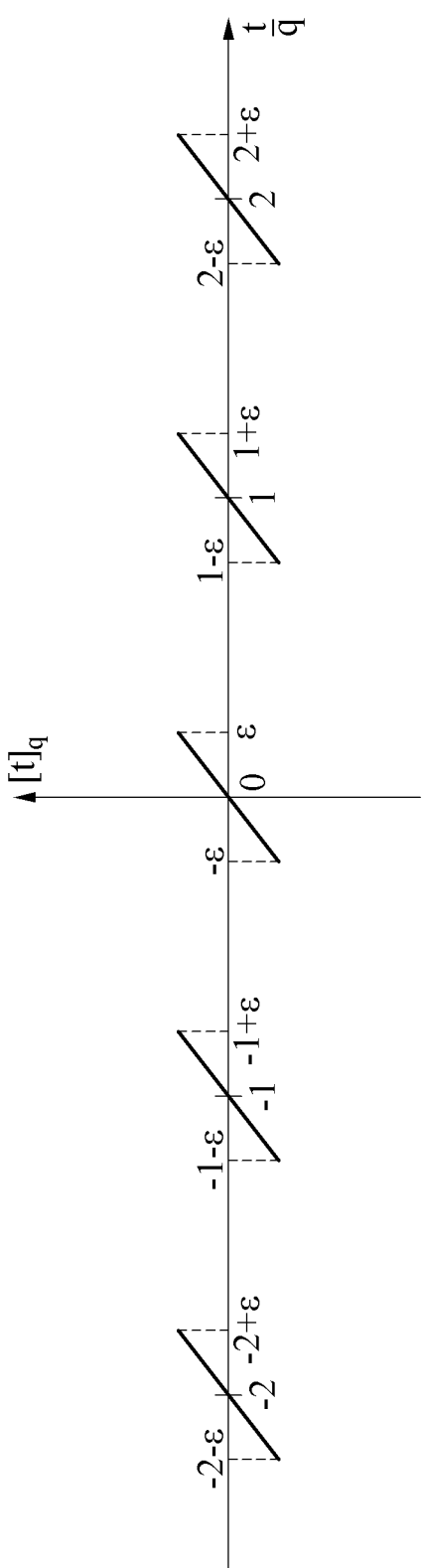
FIG. 2 illustrates an example of a scaled modulus reduction function.

FIG. 2 illustrates an example of a scaled modulus reduction function.

Herein, vectors are denoted in boldface, such as x, and every vector may be a column vector. Matrices are denoted by boldfaced capital letter, for example, A. The inner product of two vectors is denoted by $<\cdot,\cdot>$ or simply $\cdot$. Matrix multiplication is denoted by · or may be omitted when it is unnecessary. Lp-norm of a vector is denoted by $\|x\|_p = (\Sigma_i x[i]^p)^{-p}$. Here, x[i] denotes an i-th element of a vector x. Similarly, A[i; j] is an element of a matrix A in the i-th row and the j-th column. X←D denotes a sampling x according to a distribution D. When a set is used instead of a distribution, it means that x is sampled uniformly at random among set elements.

Chebyshev interpolation is a polynomial interpolation method that uses the Chebyshev polynomials as a basis of interpolation polynomial. The Chebyshev polynomial of the first kind, in short, the Chebyshev polynomial is defined by a recursive relation as follows.

$$T_0(x) = 1$$

$$T_1(x) = x$$

$$T_{n+1}(x) = 2xT_n(x) - T_{n-1}(x) \qquad \text{[Equation 1]}$$

The Chebyshev polynomial of a degree n has n distinct roots in an interval [−1, 1], and all extrema thereof may also be in [−1, 1]. Moreover, $$\frac{1}{2^{n-1}} T_n(x)$$

may be a polynomial whose maximal absolute value is minimal among monic polynomials of a degree n and the absolute value is $$\frac{1}{2^{n-1}}.$$

In Chebyshev interpolation, the n-th degree polynomial $p_n(x)$ may be represented as the sum of Chebyshev polynomials in the form as given below.

$$p_n(x) = \sum_{i=0}^{n} c_i T_i(x), \qquad \text{[Equation 2]}$$

where $p_n(x)$ is an approximate polynomial for f(x) by interpolating n+1 points $\{x_0, x_1, \ldots, x_n\}$.

$$c_i = \frac{2}{n+1} \sum_{k=0}^{n} f(x_k) T_i(x_k) \qquad \text{[Equation 3]}$$

Selecting the points $\{x_0, x_1, \ldots, x_n\}$ is key for good approximation.

For a positive integer M, $\Phi_M(X)$ may be an M-th cyclotomic polynomial of a degree N. Here, M is a power of two, M=2N, and $\Phi_M(X) = X^N + 1$. $\mathcal{R} = \mathbb{Z}/\langle \Phi_M(X) \rangle$ may be the ring of integers of a number field $\mathbb{Q}/\langle \Phi_M(X) \rangle$ and be written as $\mathcal{R}_q = \mathcal{R}/q\mathcal{R}$.

The CKKS scheme and its residual number system (RNS) variants may provide homomorphic operations on real number data with error. This may be performed by canonical embedding and its inverse. The canonical embedding $\mathbb{C}^N$ of $\alpha \in \mathbb{Q}/\langle \Phi_M(X) \rangle$ into $\sigma$ may be a vector of evaluation values a at the roots of $\Phi_M(X)$. $\pi$ may denote a natural projection from $\mathbb{H} = \{(z_j)_{j \in \mathbb{Z}_M^*} : z_j = \overline{z_{-j}}\}$ to $\mathbb{C}^{N/2}$. Here, $\mathbb{Z}^*M$ may be a multiplicative group of integers modulo M. Hereinafter, encoding $\mathbb{C}^{N/2} \to \mathcal{R}$ and decoding will be described.

Ecd(z; Δ). Encoding for an (N/2)-dimensional vector z may return the following.

$$m(X) = \sigma^{-1}(\lfloor \Delta \cdot \pi^{-1}(z) \rceil_{\sigma(\mathcal{R})}) \in \mathcal{R} \qquad \text{[Equation 4]}$$

Here, Δ is a scaling factor, and $\lfloor \pi^{-1}(z) \rceil_{\sigma(\mathcal{R})}$ denotes the discretization of σ(R) into an element of $\pi^{-1}(z)$.

Dcd(m; Δ). For an input polynomial $m(X) \in R$, a vector $j \in T$ may be output such that the entry of an index j may be given as $z_j = \lfloor \Delta^{-1} \cdot m(\zeta_M^j) \rceil$ for π(z). Here, $\zeta_M$ is an M-th root of unity, and T is a multiplicative subgroup of $\mathbb{Z}^*_M/T = \{\pm 1\}$ satisfying $\mathbb{Z}^*_M$.

An L-infinity norm of α 531 R for σ(α) may be referred to as a canonical embedding norm of a denoted by $\|\alpha\|_\infty^{can} = \|\sigma(\alpha)\|_\infty$.

Three distributions may be defined as follows. For real γ>0, $\mathcal{DG}(\gamma^2)$ denotes the distribution of vectors in $\mathbb{Z}^N$, whose entries may be sampled independently from discrete Gaussian distribution of a variance $\gamma^2$. $\mathcal{HWT}(h)$ is the set of signed binary vectors having a sign of $\{0, \pm 1\}^N$ with a Hamming weight h, and $\mathcal{ZO}(\rho)$ denotes the distribution of vectors from ±1 with probability ρ/2 for each of 1-ρ and probability being zero $\{0, \pm 1\}^N$. It may be assumed that there are ciphertexts of a level l for 0<l≤L. Here, the level l denotes the maximum number of possible multiplications before bootstrapping. For ease of description, a base p>0 and a modulus q may be fixed, and $q_l = p^l \cdot q$ may be set. The base integer p may be a base Δ for scaling.

The CKKS scheme may be defined with the following key generation, encryption, decryption, and corresponding homomorphic operations.

KeyGen($1^\lambda$). Given the security parameter λ, M as a power of two, an integer h, an integer P, a real value $\gamma$, and the maximum ciphertext modulus Q such that $Q \geq q_L$ may be determined, and sampling may be performed as follows.

$$s \leftarrow \mathcal{HWT}(h), a \leftarrow \mathcal{R}_{q_L}, e \leftarrow \mathcal{DG}(\gamma^2)$$

A secret key and a public key may be determined to be sk:=(1, s), pk:=(b, α), $\in \mathcal{R}_{q_L}^2$, respectively, where b=−as+e (mod $q_L$).

KSGen$_{sk}$(s'). $\alpha' \leftarrow \mathcal{R}_{P q_L}$ and $e' \leftarrow \mathcal{DG}(\gamma^2)$ may be sampled, and a switching key may be output as swk:=(b', a'), $\in \mathcal{R}_{P q_L}^2$, where b'=−a's+e'+Ps' (mod $Pq_L$). An evaluation key may be set as evk :=KSGen$_{sk}(s^2)$.

Enc$_{pk}$(m). $v \leftarrow \mathcal{ZO}(0.5)$ and $e_0, e_1 \leftarrow \mathcal{DG}(\gamma^2)$ may be sampled, and c=v·pk+(m+$e_0$, $e_1$) (mod $q_L$) may be output.

Dec$_{sk}$(c).$\overline{m} = \langle c, sk \rangle$ may be output.

Add($c_1, c_2$). For $c_1, c_2 \in \mathcal{R}_{q_l}^2$, $c_{add} = c_1 + c_2$ (mod $q_l$) may be output.

Mult$_{evk}$($c_1, c_2$). For $c_1=(b_1, a_1), c_2=(b_2, a_2) \in R_q^2$, assuming $(d_0, d_1, d_2) := (b_1 b_2, a_1 b_2 + a_2 b_1, a_1 a_2)$ (mod $q_l$) $c_{mult} = (d_0, d_1) + \lfloor P^{-1} \cdot d_2 \cdot \text{evk} \rceil$ (mod $q_l$) may be output.

RS$_{l \to l'}$(c). For $c \in R_{q_l}^2$ $$c' = \left\lfloor \frac{q_{l'}}{q_l} c \right\rceil (\text{mod } q_{l'})$$

may be output.

KS$_{swk}$(c). For c=($c_0, c_1$) $\in R_{q_l}^2$, c'=($c_0$, 0)+$\lfloor P^{-1} \cdot c_1 \cdot \text{swk} \rceil$ (mod $q_l$) may be output.

In addition to the operations above, key switching techniques may be used to provide various operations such as complex conjugate and rotation.

The basic operations supported herein may similarly apply to full-RNS variants of CKKS. Hence, the methods described herein may apply to the CKKS scheme and all variants thereof.

Bootstrapping for a CKKS scheme may include four steps of Modulus Raising (ModRaise), Putting Polynomial Coefficients in Plaintext Slots (CoeffToSlot), Evaluation of the Approximated Modulus Reduction (EvalMod), and Switching Back to the Coefficient Representation (SlotToCoeff).

ModRaise may be the procedure to change the modulus of a ciphertext to a greater value. It may be assumed that ct is a ciphertext satisfying $m(X)=[\langle ct, sk \rangle]_q$. $t(X)=\langle ct, sk \rangle \pmod{X^N+1}$ is one of the form $t(X)=qI(X)+m(X)$ for $\|I(X)\|_\infty < K$ with a bound $I(X) \in R$, where K may be bounded by $\mathcal{O}(\sqrt{h})$. (The following procedure may aim to compute the remainder of a coefficient of t(X), that is, the remainder $[t]_q$ obtained by dividing t by q, homomorphically. Since the modulus reduction is not an arithmetic operation, the crucial point is to find a polynomial that approximates the modulus reduction. The size of the message may be controlled, and thus, $\epsilon$ may be ensured for small $m \ll \epsilon \cdot q$.

In relation to CoeffToSlot, the approximate homomorphic operations may be performed in plaintext slots. Thus, in order to deal with t(X), polynomial coefficients may need to be put in the plaintext slots. In CoeffToSlot step, Ecd may be performed homomorphically using matrix multiplication, FFT-like operation using relationships of roots of unity, or a hybrid method of both. Then, two ciphertexts encrypting $$z_0' = \left(t_0, \ldots, t_{\frac{N}{2}-1}\right) \text{ and } z_1' = \left(t_{\frac{N}{2}}, \ldots, t_{N-1}\right)$$

(or a combination thereof $$t_0 + i \cdot t_{\frac{N}{2}}, \ldots, t_{\frac{N}{2}-1} + i \cdot t_N)$$

may be obtained.

In EvalMod step, the elements of each slot may be considered from the viewpoint of single instruction multiple data (SIMD). In other words, $t=qI+m$ may denote an element in a slot. In EvalMod step, approximated evaluation of $[t]_q$ may be performed.

SlotToCoeff may be an inverse operation of CoeffToSlot.

As described above, the key part of bootstrapping of the CKKS scheme is the homomorphic evaluation of modulus reduction.

As shown in FIG. 2, by scaling a modulus reduction function by 1/q, $[t]_q$ may be defined as $t-k$ for $t \in I_k$. Here, $I_k=[k-\epsilon, k+\epsilon]$, and k may be an integer satisfying $|k|<K$. Further, $\epsilon$ may denote the ratio of the maximum coefficient of a message polynomial and a ciphertext modulus, that is, $$\frac{|m|}{q} < \epsilon.$$

The domain of $[t]_q$ may be given as $\cup_{k=-K+1}^{K-1} I_k$. In other words, $$q \cdot \left[\frac{t}{q}\right]_q \approx m \text{ for } t = q \cdot I + m.$$

Hereinafter, a method of directly finding an approximate polynomial $p_0(t)$ of $[t]_q$ without using intermediate approximation such as a sine or cosine function will be described. The method may use least-squares estimation or L2-norm optimization. The goal may be to find the set of coefficients $c=(c_0, c_1, \ldots, c_n)$ to minimize $\|[t]_q - p(t)\|_\infty$. Here, a polynomial of a degree n may be defined by $p(t)=\Sigma_{i=0}^n c_i \cdot t^i$. Such a polynomial may be referred to as a minimax polynomial. p(t) may be equivalent to the inner product of c and $T=(1, t^1, \ldots, t^n)$.

Here, $t'_i$ may be sampled uniformly at intervals of $\delta \ll \epsilon$ in each $I_k$, namely, $k-\epsilon, k-\epsilon+\delta, \ldots, k+\epsilon-\delta, k+\epsilon$. There are $$\frac{2\epsilon}{\delta} + 1$$

samples in $I_k$, and thus the total number of samples may be $$N_{tot} = (2K-1)\left(\frac{2\epsilon}{\delta} + 1\right).$$

With $N_{tot}$ samples of $t_i$, a vector of the powers of $t_i$, that is, $T_i=(1, t_i, t_i^2, \ldots, t_i^n)$ for $1 \leq i \leq N_{tot}$ may be determined.

In other words, $I_k=[k-\epsilon, k+\epsilon]$ samples may be extracted respectively from the piecewise continuous intervals $$\frac{2\epsilon}{\delta} + 1$$

of the modulus reduction function shown in FIG. 2. As will be described later, in the modulus reduction function, each of the piecewise continuous intervals $I_k=[k-\epsilon, k+\epsilon]$ may have a symmetrical shape around a reference point (for example, −2, −1, 0, 1, or 2). The approximate polynomial may be determined using only the samples extracted from a portion divided by the reference point in each of the piecewise continuous intervals $I_k=[k-\epsilon, k+\epsilon]$ (for example, a portion having the value of the modulus reduction function greater than 0 or less than 0).

The object function to be minimized is given as follows.

$$\max_i |[t_i]_q - p(t_i)| = \left\| ([t_0]_q - p(t_0), \ldots, [t_{N_{tot}}]_q - p(t_{N_{tot}}) ) \right\|_\infty \quad \text{[Equation 6]}$$
$$= \|y - T \cdot c\|_\infty,$$

Here, T is an $N_{tot} \times (n+1)$ matrix satisfying $T[i,j]=t_i^j$, and y is a vector satisfying $y[i]=[t_i]_q$. Instead of the L-infinity norm, the above objective function may be replaced with a loss function using the L2-norm. Then, the optimal solution for L2-norm minimization may be efficiently computed. $L_c$ may denote an L2-norm with a coefficient c. Then, c that minimizes the following may be found.

$$L_c = \|y - T \cdot c\|_2 \quad \text{[Equation 7]}$$
$$= (y - T \cdot c)^T (y - T \cdot c)$$

Unfortunately, the entries of T may have very large values or very small values close to zero as the degree n of the polynomial is high.

Thus, the Chebyshev polynomials may be utilized as the basis of the polynomial instead of the power basis. In other words, the $N_{tot} \times (n+1)$ matrix T may be redefined with entries $$T[i, j] = T_j\left(\frac{t_i}{K}\right).$$

As $$t_i \in \bigcup_{k=-K+1}^{K-1} I_k, \left|\frac{t_i}{K}\right| < 1$$

may be satisfied. Hence, the entries of T may be well-distributed in $[-1, 1]$ rather than large values or small values around 0.

Then, the optimal coefficient vector c* may be given as follows.

$$c^* = \arg\min_c L_c \quad \text{[Equation 8]}$$

As the loss is a convex function, the optimum solution c may be at the gradient zero. The gradient of the loss function $L_c$ may be given as follows.

$$\nabla L_c = -2y^T T + 2c^T T^T T \quad \text{[Equation 9]}$$

Setting the gradient to zero may produce the optimum coefficient as follows.

$$\nabla L_{c^*} = 0$$

$$\Rightarrow c^* = (T^T T)^{-1} T^T y \quad \text{[Equation 10]}$$

To sum up, the modulus reduction function may be approximated as follows.

$$[t]_q \approx p_o(t) = \sum_{i=0}^{n} c^*[i] \cdot T_i\left(\frac{t}{K}\right), \quad \text{[Equation 11]}$$

where $t \in \bigcup_{k=-K+1}^{K-1} I_k$

The approximation error may be bounded by the multiplication of the maximum error of sampled points and $$O\left(1 + \frac{n}{N_{tot}}\right).$$

For $t \in I_k$, the approximation error may be defined as an absolute value as follows.

$$E(t) = (t-k) - p_o(t) \quad \text{[Equation 12]}$$

E(t) may be a polynomial for a domain $t \in I_k$. $E(t) = \Sigma_j \hat{c}_j x^j$ may be denoted. $|E(t_i)|$ for discrete points $t_i$'s may be optimized.

$[t_i, t_i+\delta)$ for t in a small interval $|E(t)|$ may be considered. Then, $|E(t)| \leq |E(t_i)| + |E(t) - E(t_i)|$ may be determined, and $|E(t) - E(t_i)|$ may be bounded as follows.

$$|E(t) - E(t_i)| = \left|\sum_j \hat{c}_j((t_i + \Delta t)^j - t_i^j)\right| \quad \text{[Equation 13]}$$

-continued $$\approx \left|\sum_j \hat{c}_j t_i^j \left(j\frac{\Delta t}{t_i}\right)\right|$$

$$\leq \left|n\frac{\delta}{t_i}\right| \cdot \left|\sum_j \hat{c}_j t_i^j\right|$$

$$= O\left(n\frac{1}{N_{tot}}\right)|E(t_i)|,$$

Here, $t \in [t_i, t_i+\delta)$ may be built for $\Delta t = t - t_i$. As $\Delta t < \delta \ll t_i$, linear approximation $$\left(1 + \frac{\Delta t}{t_i}\right)^j \approx \left(1 + j\frac{\Delta t}{t_i}\right)$$

may be applied. Moreover, $t_i \geq \epsilon$ may be built for $$\frac{\Delta t}{t_i} \leq \frac{\delta}{\epsilon} = O\left(\frac{1}{N_{tot}}\right).$$

Otherwise, at least $$\frac{\delta}{t_i} < 1$$

may be always satisfied.

Hence, the following equation may be derived.

$$\max_{t \in \bigcup_{k=-K+1}^{K-1} I_k} |[t]_q - p_o(t)| = \max_i ([t_i]_q - p_o(t_i)) \cdot O\left(1 + \frac{n}{N_{tot}}\right) \quad \text{[Equation 14]}$$

In summary, with fine sampling, the maximum error of sampled points may be close to the global maximum of the approximation error. Moreover, since the domain of the object function is the real numbers with error in the CKKS scheme, it may be reasonable to handle the sampled values.

An L-infinity norm may be bounded by an L2-norm as follows.

$$\frac{1}{\sqrt{N_{tot}}}\|x\|_2 \leq \|x\|_\infty \leq \|x\|_2 \quad \text{[Equation 15]}$$

Thus, minimizing the L2-norm may reduce the L-infinity norm. As it is not a tight bound, there may be room for optimization using a higher norm. However, the solution of the L2-norm may be clear and computed effortlessly. Although it is difficult to find a minimax polynomial of the modulus reduction function, it is possible to find the near-optimal solution of the minimax polynomial in a very efficient way without iteration through the L2-norm optimization problem.

Considering $N_{tot} > n$, the matrix inversion $(T^T T)^{-1}$ may be the dominant computation. Hence, the time complexity may be $\mathcal{O}(N_{tot}^{2.37})$ when the Coppersmith-Winograd algorithm is used. It is quite acceptable because is pre-computed and stored as a coefficient for the baby-step giant-step algorithm to be described later or for the Paterson-Stockmeyer algorithm.

An approximate polynomial may be optimized with the Chebyshev polynomial as a basis. Hence, the baby-step giant-step algorithm and the modified Paterson-Stockmeyer algorithm may be applied for the efficient homomorphic evaluation of the proposed polynomial. Using the Algorithm baby-step giant-step algorithm, $p_o(t)$ may be homomorphically evaluated with at most $2^l+2^{m-l}+m-l-3$ nonscalar multiplications while consuming m depth. Here, $2^m$ may be greater than the degree n.

When the Chebyshev polynomials are evaluated through the baby-step giant-step algorithm, $T_{2n}=2T_n^2-T_0$ and $T_{2n+1}=2T_nT_{n+1}-T_1$ may be used, and the multiplication of 2 may be replaced by an addition. Hence, one nonscalar multiplication and two additions may be required.

In baby-step of the baby-step giant-step algorithm, polynomials of a degree $2^l-1$ may be evaluated, and there may be at most $2^m/2^l$ polynomials. However, when $2^m > n+1$, there may be polynomials with all-zero coefficients. By ignoring them, there may be $\lceil (n+1)/2^l \rceil$ polynomials with a degree of at most $2^l-1$ in the baby-step. In other words, as $2^m$ and $n+1$ differ, there may be $0 \cdot T_0(t) + 0 \cdot T_1(t) + \ldots + 0 \cdot T_2^{l-1}(t)$ polynomials corresponding to $2^{m-l} - \lceil (n+1)/2^l \rceil$ in the baby-step giant-step algorithm. Hence, these zero polynomials may be ignored, and from the recursive structure, exactly $2^{m-l} - \lceil (n+1)/2^l \rceil$ nonscalar multiplications may be ignored in the giant-step. Hence, by using $2^m > n \geq 2^{m-1}$, N (n)=N(n-$2^{m-1}$)+N($2^{m-1}$-1) +1 may be obtained, and $N(n) = \lceil (n+1)/2^l \rceil - 1$ may be yielded.

Here, N (k), $k \geq 2^l$ denotes the number of nonscalar multiplications in the giant-step, and N(k)=0 for $k < 2^l$. Thus, the number of nonscalar multiplications may be given as $\lceil (n+1)/2^l \rceil - 1 + 2^l - 1 - m - l - 1$.

The number of scalar multiplications may be $(n+1) - \lceil (n+1)/2^l \rceil$, and the number of additions may be $n+2(2^l+m-l-2)$. The depth and the number of nonscalar multiplications may be minimized when m is the smallest integer satisfying $2^m > n$ and $l \approx m/2$.

Maximum approximation errors may be similar to each other when the degrees of approximate polynomials are 2n-1 and 2n. This is because the target of approximation, the modulus reduction function $[t]_q$, is an odd function. The following proposition shows that the minimax polynomial for an odd function is an odd function.

Proposition: If f(t) is an odd function, the best approximation among the polynomials of a degree n is also odd.

$P_m$ denotes a subspace of a polynomial function of a degree of at most m, and $f_m(t)$ denotes a unique element of $P_m$ that is closest to f(t) in a supreme norm.

$$p(t) \in P_m \text{ by } p(t) = \frac{1}{2}(f_m(t) - f_m(-t))$$

may be defined. Then, for all u in a domain of f(t), the following equation may be established.

$$|f(u) - p(u)| = \left| f(u) - \frac{1}{2}(f_m(u) - f_m(-u)) \right| \quad \text{[Equation 16]}$$
$$\leq \frac{1}{2}|f(u) - f_m(u)| + \frac{1}{2}|f(u) + f_m(-u)|$$
$$= \frac{1}{2}|f(u) - f_m(u)| + \frac{1}{2}|f(-u) - f_m(-u)|$$
$$\leq \sup_t |f(t) - f_m(t)|.$$

If $p(t) \neq f_m(t)$, it contradicts that $f_m(t)$ is the closest to f(t). Hence, $f_m(t) = p(t) = \frac{1}{2}(f_m(t) - f_m(-t))$ may be an odd function.

Among the polynomial coefficients of the proposed method, the coefficient of even-order terms may have a very small value that is close to 0 in $p_0(t)$. This is an evidence that the proposed method finds a polynomial near the minimax polynomial because the modulus reduction function is an odd function. Even terms may be a handicap in finding an approximate polynomial. Therefore, a more accurate approximate polynomial may be generated by approximating using only odd-order Chebyshev polynomials.

One of the advantages of the proposed method is that it is possible to utilize the characteristics of the odd function. Using the fact that the odd function is symmetric about the origin, the L2-norm minimization may be solved only with samples with values greater than 0 (or samples with values less than 0). Accordingly, the number of rows and the number of columns of the matrix T may be respectively halved. Consequently, the time complexity of matrix inversion may be reduced to about ⅛. Further, some operations on even-order terms may be ignored during homomorphic evaluation.

When the proposed method is used, a more suitable parameter may be selected to reduce a level loss during bootstrapping. As described above, the proposed method may find a more accurate approximate polynomial if it is relatively greater than the previous best method. Hereinafter, a method of selecting parameters based on these characteristics will be described.

For noise estimation, the following lemmas may be used.

Lemma 2 Let $c' \leftarrow RS_{l \to l'}(c)$ for a ciphertext $c \in \mathcal{R}_{ql}^2$. Then $$\langle c', sk \rangle = \frac{q_{l'}}{q_l}\langle c, sk \rangle + e(\bmod q_{l'})$$

for some $e \in \mathcal{R}$ satisfying $\|e\|_\infty^{can} \leq B_{rs}$ for $B_{rs} = \sqrt{N/3} \cdot (3 + 8\sqrt{h})$.

Lemma 3 Let $c \in \mathcal{R}_q^2$ be a ciphertext with respect to a secret key sk'=(1-s') and let swk $\leftarrow$ KSGen$_{sk}$ (s'). Then $c' \leftarrow KS_{swk}$ (c) satisfies $\langle c', sk \rangle = \langle c, sk' \rangle + e_{ks}(\bmod q)$ for some $e_{ks} \in \mathcal{R}$ with $\|e_{ks}\|_\infty^{can} \leq P^{-1} \cdot q \cdot B_{ks} + B_{rs}$ for $B_{ks} = 8\sigma N/\sqrt{3}$.

In order to maintain the precision of values in slots, a sufficiently great scaling factor $\Delta_{bs} = \mathcal{O}(q)$ may be multiplied in CoeffToSlot step. $\Delta_{bs}$ may be different from a scaling factor of a message $\Delta$. From Lemma 3 above, the total error of CoeffToSlot step may be $\mathcal{O}(B_{rs})$ when a sufficiently great P is selected.

In EvalMod step, each component in a corresponding plaintext slot may contain $t_j + e_j$ for a small error $e_j$ such as $|e_j| \leq \mathcal{O}(B_{rs})$. Since an approximate polynomial $p_0(t_j)$ is evaluated with the scaling factor $\Delta_{bs}$, the approximation error may be as follows.

$$\Delta_{bs}\left|\left[\frac{t_j}{q}\right]_q - p_o\left(\frac{t_j + e_j}{q}\right)\right| \leq \quad \text{[Equation 17]}$$
$$\Delta_{bs}\left|\left[\frac{t_j}{q}\right]_q - \left[\frac{t_j + e_j}{q}\right]_q\right| + \Delta_{bs}\left|\left[\frac{t_j + e_j}{q}\right]_q - p_o\left(\frac{t_j + e_j}{q}\right)\right| \leq$$
$$\Delta_{bs} \cdot \frac{|e_j|}{q} + \Delta_{bs}\max_t |[t]_q - p_o(t)|$$

To bound an error in EvalMod step by $\mathcal{O}(B_{rs})$, the following may need to be guaranteed.

$$\max_t |[t]_q - p_o(t)| < \frac{|e_j|}{q} \quad \text{[Equation 18]}$$

When the error in EvalMod step is bounded by $\mathcal{O}(B_{rs})$, an error after SlotToCoeff step may be bounded by $\mathcal{O}(\sqrt{N} \cdot B_{rs})$.

In Lemma 2 above, an error in bootstrapping may be independent of the scaling factor of the message $\Delta$ and bounded by $\mathcal{O}(N\sqrt{h})$. Thus, the plaintext precision may be proportional to $\log \Delta$, where $\Delta$ may determine $|m|$. In the method described above, the level loss of bootstrapping may be approximately proportional to $\mathcal{O}(m^{3/2})$ rather than $\mathcal{O}(m)$. This is one of the advantages of the proposed method, which may overcome the limitations in the existing method and obtain more effects as a more accurate calculation is required.

Various factors, such as the number of slots, may affect the plaintext precision. Thus, the plaintext precision may be obtained using a numerical method and be used to determine parameters. When the proposed method is used, a relatively small q may be used, and thus in some cases, more levels may be left after bootstrapping.

Through the foregoing description, an approximate polynomial of the modulus reduction function for bootstrapping may be determined. The problem of finding an approximate polynomial for modulus reduction may be cast into an L2-norm minimization problem of which a solution may be directly found without an intermediate function such as a sine function.

As the approximation error in the proposed method is not subject to a sine function, it is possible to approximate the modulus reduction with high accuracy. Using the Chebyshev polynomials as a basis, a lower approximation error may be achieved even with a polynomial with a lower degree. Further, the proposed polynomial may utilize the baby-step giant-step algorithm and the Paterson-Stockmeyer algorithm. It may be learned that the proposed polynomial reduces the required number of operations for homomorphic approximate modulus reduction, based on the numbers of nonscalar multiplications, scalar multiplications, and additions for the baby-step giant-step algorithm.

The proposed method may offer a less-error bootstrapping especially when a large scaling factor is selected. Accordingly, the choice of parameters may be expanded. Most importantly, the proposed method may be essential for applications that require accurate approximation. Conversely, the proposed method does not have such as lower bound and thus, may select better parameters. Consequently, bootstrapping may consume lower levels when using the proposed method.

Figure 3:
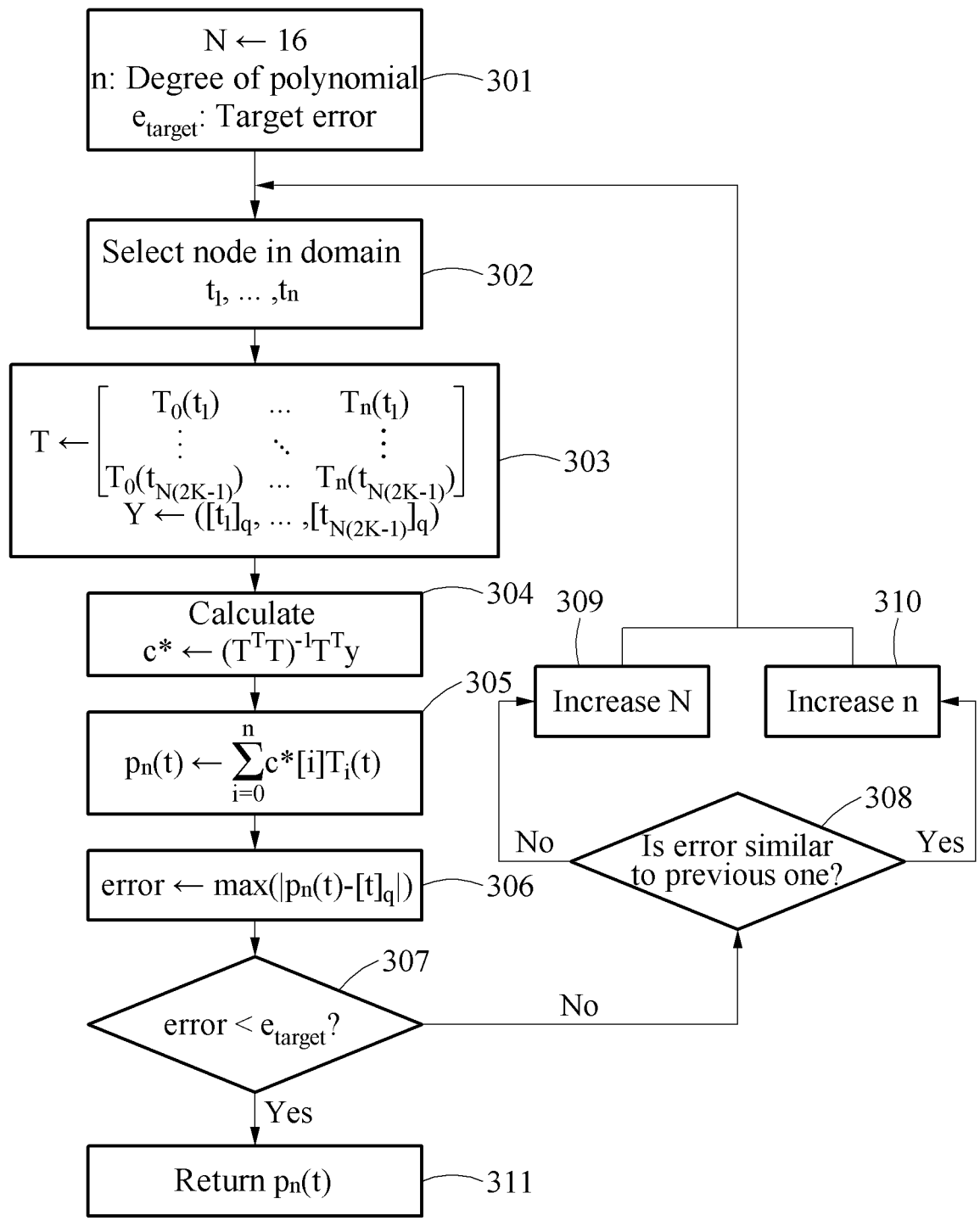
FIG. 3 illustrates an example of determining an approximate polynomial.

FIG. 3 illustrates an example of determining an approximate polynomial.

In operation 301, the number of samples N, the degree n of an approximate polynomial, and a target error $e_{target}$ may be determined. For example, the number of samples N may be determined to be 16. However, examples are not limited thereto. The number of initial samples may be set in various manners according to circumstances.

In operation 302, N samples $t_1, \ldots, t_{N(2K-1)}$ may be extracted from each interval $I_k$. Here, $I_k = [k-\in, k+\in]$.

In operation 303, an approximate polynomial T using the Chebyshev polynomials as a basis and a function value Y corresponding to a modulus reduction may be determined. Here, $[t]=t-k$ for $t \in I_k$ and $\text{dom}([\cdot]_q) = \Sigma_{k=-(K-1)}^{K-1} I_k$, K is constant $T_i(\cdot)$ may denote an i-order Chebyshev polynomial of the first kind.

In operation 304, an optimal coefficient vector $c^*$ that minimizes an L2-norm of the differences between modulus reduction function values $[t_i]_q$ and values $p(t_i) = \Sigma_{i \in [0,n]} c[k] T_k(t_i)$ of polynomials of a degree n may be determined for the respective samples.

In operation 305, an approximate polynomial $p_n(t)$ may be determined using the determined optimal coefficient vector $c^*$.

In operation 306, an error error between the determined approximate polynomial pn(t) and the modulus reduction function $[t]_q$ may be calculated.

In operation 307, whether the calculated error error is less than a target error $e_{target}$ may be determined. If the calculated error error is greater than or equal to the target error $e_{target}$, operation 308 may be performed.

In operation 308, whether a similarity between the calculated error error and an error calculated in a previous step is less than a predetermined threshold similarity is determined. If the similarity is less than the predetermined threshold similarity, that is, if the error error calculated at the current step is reduced below the error calculated in the previous step and thus, they are not similar to each other, operation 309 may be performed to increase the number of samples N. Conversely, if the similarity is greater than or equal to the predetermined threshold similarity, that is, if the error error calculated in the current step is similar to the error calculated in the previous step, operation 310 may be performed to increase the degree n of the approximate polynomial. As such, since the approximate polynomial may not approximate the modulus reduction function well if there are fewer samples, the number of samples N needs to be increased. That the error is not significantly reduced even when the number of samples is increased may indicate that the degree of the approximate polynomial is insufficient. Thus, the degree n may be increased. As described above, since the approximate polynomial may include odd-order terms, the degree n may be increased by 2.

If it is determined in operation 307 that the calculated error error is less than the target error $e_{target}$, operation 311 may be performed to finally determine and return the approximate polynomial $p_n(t)$.

The approximate polynomial expressed by the coefficients found using the method described above may be utilized for bootstrapping in fully homomorphic encryption through various methods including operations for reducing the depth or the number of operations, such as the baby-step giant-step algorithm or Paterson-Stockmeyer algorithm.

In some examples, only Chebyshev polynomials of a portion of degrees may be used as the approximate polynomial for ease of operation. Further, in addition to the Chebyshev polynomials, Legendre polynomials or powers of x may be used as a basis.

Figure 4:
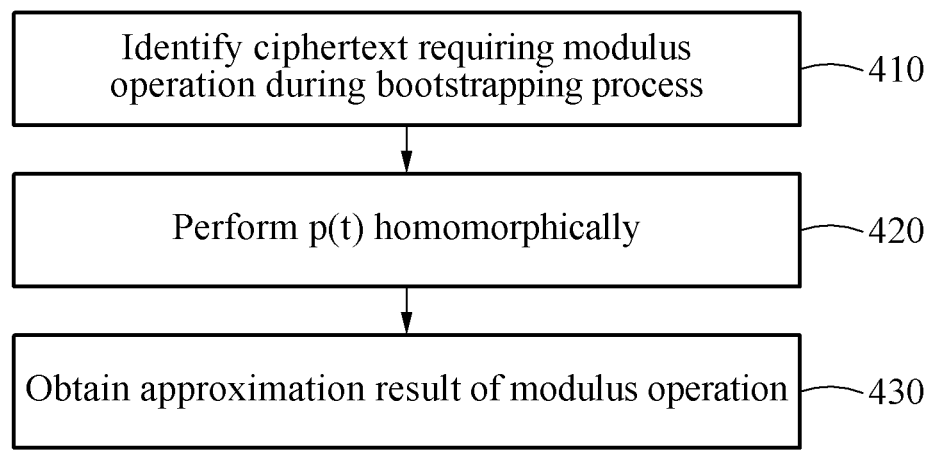
FIG. 4 illustrates an example of bootstrapping using an approximate polynomial determined.

FIG. 4 illustrates an example of bootstrapping using an approximate polynomial determined.

In operation 410, a ciphertext requiring a modulus operation during a bootstrapping process may be identified. In operation 420, an approximate polynomial p(t) for the modulus reduction function determined in the example of FIG. 3 may be evaluated homomorphically. In operation 430, an approximation result of the modulus operation may be obtained.

Figure 5:
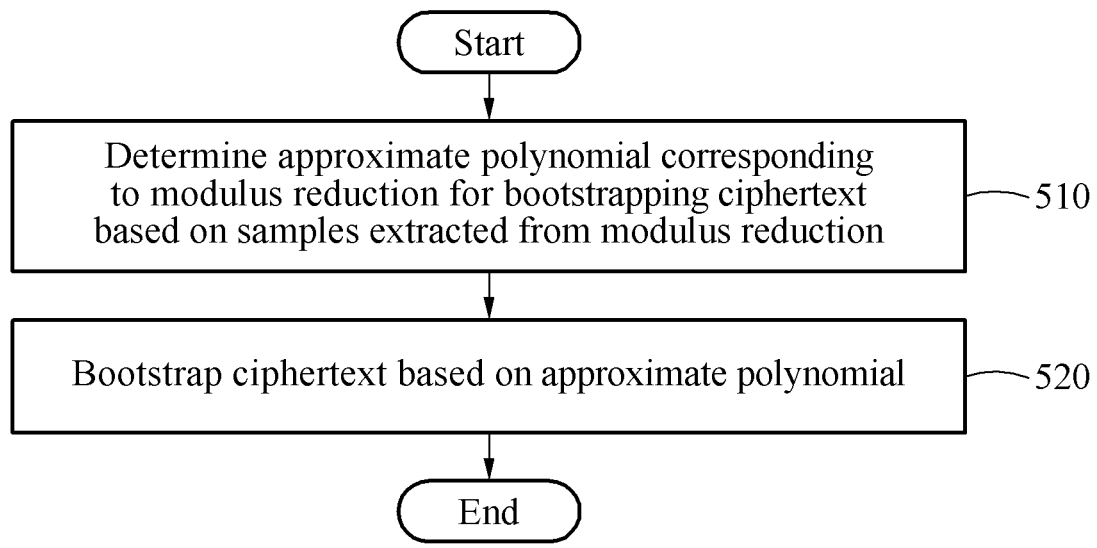
FIG. 5 illustrates an example of a ciphertext processing method.

FIG. 5 illustrates an example of a ciphertext processing method.

Referring to FIG. 5, a ciphertext processing method performed by a processor provided in a ciphertext processing apparatus is shown.

In operation 510, the ciphertext processing apparatus determine an approximate polynomial corresponding to a modulus reduction for bootstrapping a ciphertext based on samples extracted from the modulus reduction. The ciphertext processing apparatus may determine a coefficient of the approximate polynomial such that differences between the samples and values of the approximate polynomial are less than a predetermined threshold.

The ciphertext processing apparatus may verify whether the differences between the samples and the values of the approximate polynomial are less than the predetermined threshold, and increase, in response to the differences being greater than or equal to the predetermined threshold, the number of samples or the degree of the approximate polynomial based on a comparison between the differences and differences determined in a previous step. For example, the ciphertext processing apparatus may increasing the number of samples, in response to a similarity between the differences and the differences determined in the previous step being less than a predetermined threshold similarity, and increase the degree of the approximate polynomial, in response to the similarity being greater than or equal to the predetermined threshold similarity. The differences between the samples and the values of the approximate polynomial may be determined based on an L2-norm between the samples and the values of the approximate polynomial.

The ciphertext processing apparatus may determine the approximate polynomial including odd-order terms. The ciphertext processing apparatus may determine the approximate polynomial using the Chebyshev polynomials as a basis.

In operation 520, the ciphertext processing apparatus bootstraps the ciphertext based on the approximate polynomial. The ciphertext processing apparatus may bootstrap the ciphertext by homomorphically evaluating the modulus reduction using the approximate polynomial.

The descriptions provided with reference to FIGS. 1 to 4 may apply to the operations shown in FIG. 5, and thus further detailed descriptions will be omitted.

Figure 6:
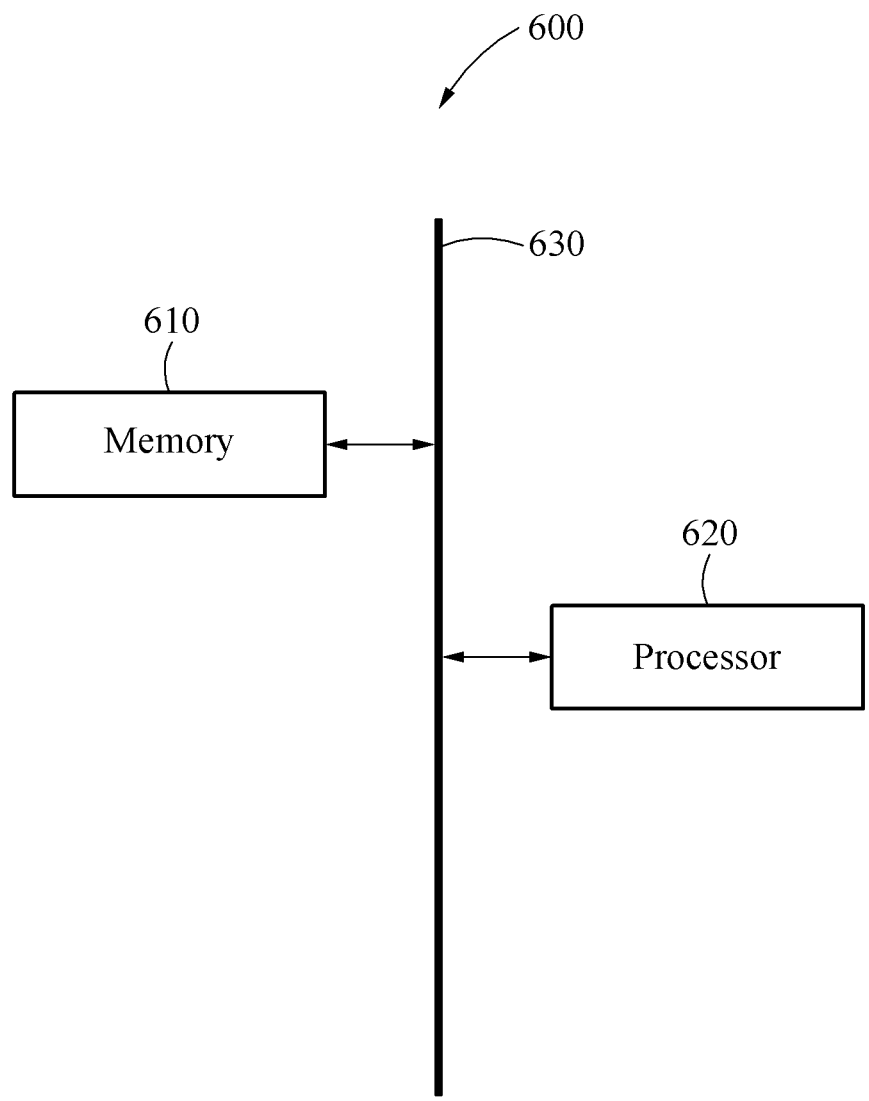
FIG. 6 illustrates an example of a ciphertext processing apparatus.

FIG. 6 illustrates an example of a ciphertext processing apparatus.

Referring to FIG. 6, a ciphertext processing apparatus 600 includes a memory 610 and a processor 620. The memory 610 and the processor 620 may communicate with each other through a bus 630.

The memory 610 may include computer-readable instructions. The processor 620 may perform the operations described above when the instructions stored in the memory 610 are executed by the processor 620. The memory 610 may be a volatile memory or a non-volatile memory.

The processor 620 is a device that executes the instructions or programs or that controls the ciphertext processing apparatus 600, and may include, for example, a central processing unit (CPU), a graphics processing unit (GPU), and the like. The processor 620 may determine an approximate polynomial corresponding to a modulus reduction for bootstrapping a ciphertext based on samples extracted from the modulus reduction, and bootstrap the ciphertext based on the approximate polynomial.

The ciphertext processing apparatus 600 may be used in a process of bootstrapping a ciphertext in which a plaintext including real numbers or complex numbers is encrypted, during fully homomorphic encryption. If the degree of the approximate polynomial determined by the ciphertext processing apparatus 600 is lowered, the number of operations may be reduced. Thus, resources required for the ciphertext processing operation may be effectively reduced.

In addition, the ciphertext processing apparatus 600 may be applied to the technical field of encryption/security, such as, for example, cloud computing, information protection machine learning, all other homomorphic encryption applications, network security, system (terminal) security, password/authentication, security management, content/information leakage prevention security, authentication service, and the like.

In addition, the ciphertext processing apparatus 600 may process the operations described above.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

What is claimed is:

1. A method comprising:
    determining an approximate polynomial corresponding to a modulus reduction for bootstrapping a ciphertext based on samples extracted from the modulus reduction; and
    bootstrapping the ciphertext based on the approximate polynomial,
    wherein the determining comprises:
        increasing the number of samples, in response to a similarity between current differences between the samples extracted from the modulus reduction and values of the approximate polynomial and differences determined in a previous step being less than a threshold similarity; and
        increasing a degree of the approximate polynomial, in response to the similarity being greater than or equal to the threshold similarity.

2. The method of claim 1, wherein the determining comprises determining a coefficient of the approximate polynomial such that the current differences between the samples extracted from the modulus reduction and the values of the approximate polynomial are less than a predetermined threshold.

3. The method of claim 2, wherein the determining comprises:
    verifying whether the current differences between the samples extracted from the modulus reduction and the values of the approximate polynomial are less than the predetermined threshold; and
    increasing, in response to the current differences being greater than or equal to the predetermined threshold, the number of samples or a degree of the approximate polynomial based on a comparison between the current differences and differences determined in a previous step.

4. The method of claim 2, wherein the differences between the samples extracted from the modulus reduction and the values of the approximate polynomial are determined based on an L2-norm between the samples extracted from the modulus reduction and the values of the approximate polynomial.

5. The method of claim 1, wherein the determining comprises determining the approximate polynomial including odd-order terms.

6. The method of claim 1, wherein the determining comprises determining the approximate polynomial using the Chebyshev polynomials as a basis.

7. The method of claim 1, wherein the samples are extracted from a piecewise continuous interval having a symmetric shape about a reference point in a function corresponding to the modulus reduction.

8. The method of claim 7, wherein the samples are extracted from a portion divided by the reference point in the piecewise continuous interval.

9. The method of claim 1, wherein the bootstrapping comprises bootstrapping the ciphertext by homomorphically evaluating the modulus reduction using the approximate polynomial.

10. A non-transitory computer-readable storage medium storing instructions that, when executed by a processor, cause the processor to perform the method of claim 1.

11. An apparatus for processing a ciphertext, the apparatus comprising:
    one or more hardware processors configured to:
        determine an approximate polynomial corresponding to a modulus reduction for bootstrapping a ciphertext based on samples extracted from the modulus reduction, and
        bootstrap the ciphertext based on the approximate polynomial,
    wherein the one or more hardware processors are configured to:
        increase the number of samples, in response to a similarity between current differences between the samples extracted from the modulus reduction and values of the approximate polynomial and differences determined in a previous step being less than a threshold similarity, and
        increase a degree of the approximate polynomial, in response to the similarity being greater than or equal to the threshold similarity.

12. The apparatus of claim 11, wherein the one or more hardware processors are configured to determine a coefficient of the approximate polynomial such that the current differences between the samples extracted from the modulus reduction and the values of the approximate polynomial are less than a predetermined threshold.

13. The apparatus of claim 12, wherein the one or more hardware processors are configured to:
    verify whether the current differences between the samples extracted from the modulus reduction and the values of the approximate polynomial are less than the predetermined threshold, and
    increase, in response to the current differences being greater than or equal to the predetermined threshold, the number of samples or a degree of the approximate polynomial based on a comparison between the current differences and differences determined in a previous step.

14. The apparatus of claim 12, wherein the differences between the samples extracted from the modulus reduction and the values of the approximate polynomial are determined based on an L2-norm between the samples and the values of the approximate polynomial.

15. The apparatus of claim 11, wherein the one or more hardware processors are configured to determine the approximate polynomial including odd- order terms.

16. The apparatus of claim 11, wherein the one or more hardware processors are configured to determine the approximate polynomial using the Chebyshev polynomials as a basis.

17. The apparatus of claim 11, wherein the samples are extracted from a piecewise continuous interval having a symmetric shape about a reference point in a function corresponding to the modulus reduction.

18. The apparatus of claim 17, wherein the samples are extracted from a portion divided by the reference point in the piecewise continuous interval.

19. A method comprising:
    determining an initial approximate polynomial corresponding to a modulus reduction for bootstrapping a ciphertext based on an initial number of samples extracted from the modulus reduction;

calculating an error between the initial approximate polynomial and the modulus reduction function;

increasing the initial number of samples in response to a similarity between the error and an error calculated in a previous step being less than a threshold similarity;

increasing a degree of the initial approximate polynomial response to the similarity between the error and the error calculated in a previous step is being greater than or equal to the threshold similarity;

determining an updated approximate polynomial based on either the increased number of initial samples or the increased degree of the initial approximate polynomial; and homomorphically evaluating the modulus reduction using the updated approximate polynomial.

20. The method of claim 19, wherein calculating the error includes determining that differences between the initial number of samples extracted from the modulus reduction and values of the initial approximate polynomial are greater than or equal to a threshold.

* * * * *